Jan. 29, 1957 J. R. GOMERSALL 2,779,850
GLASS ENCLOSED HEATING ELEMENT
Filed Sept. 14, 1953 2 Sheets-Sheet 1
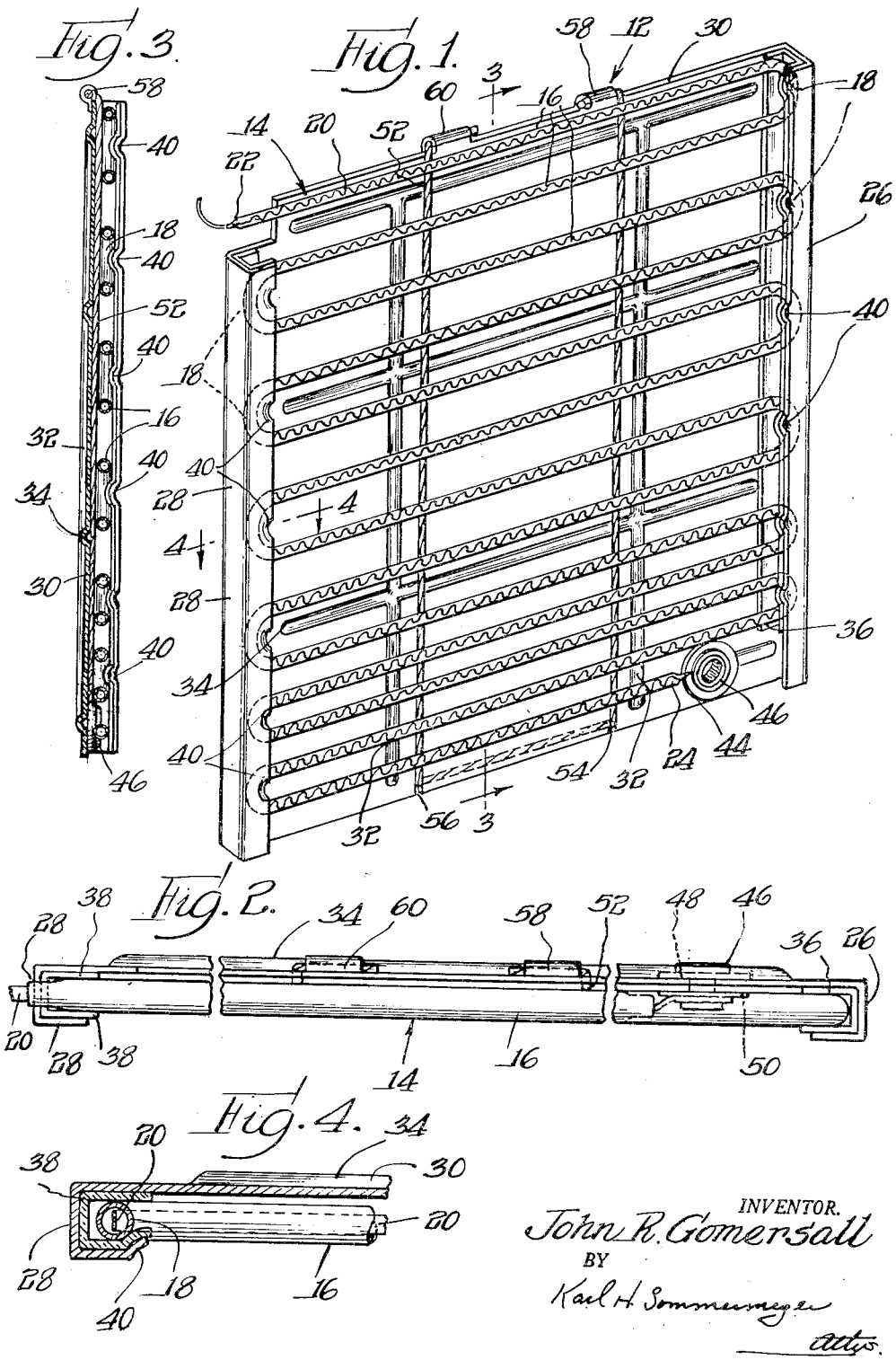
INVENTOR.
John R. Gomersall
BY
Karl H. Sommermeyer
attys.

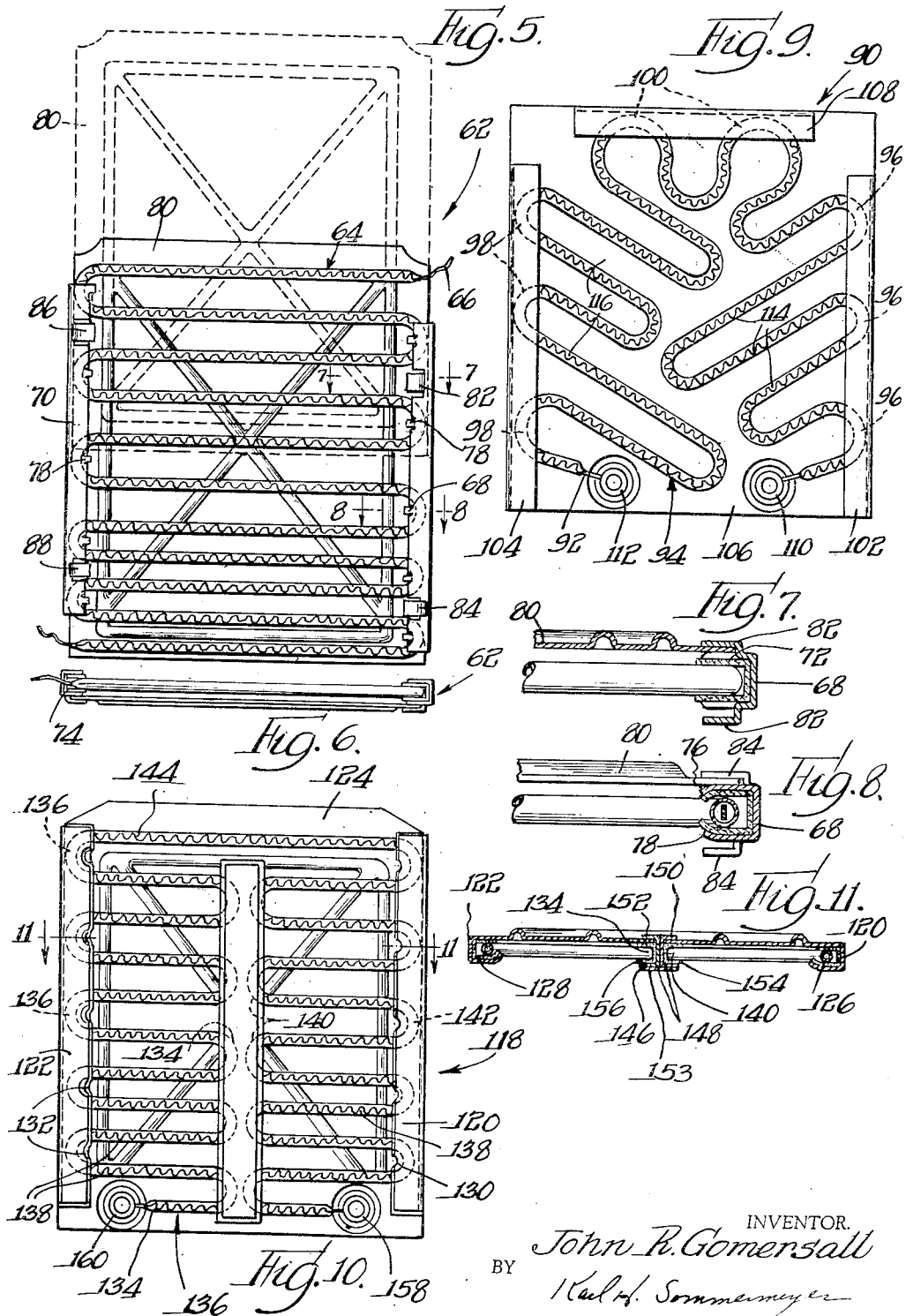

United States Patent Office 2,779,850
Patented Jan. 29, 1957

2,779,850
GLASS ENCLOSED HEATING ELEMENT

John R. Gomersall, Elgin, Ill., assignor to McGraw Electric Company, Elgin, Ill., a corporation of Delaware Application September 14, 1953, Serial No. 379,759

16 Claims. (Cl. 219—19)

The present invention relates to a novel electric heating unit, and more particularly to a novel heating unit of the type used in toasters and the like.

This application is a continuation-in-part of a co-pending application, Serial No. 145,752, filed by John R. Gomersall, on February 23, 1950, now Patent 2,680,183.

In the past, most toasters commercially available have been provided with heating elements which are wound on a mica card. The cost of natural mica crystals of the proper size is usually prohibitive, and, therefore, sheets of mica flakes held together with an inorganic binder have been used. However, such bonded mica sheets are still relatively expensive, and, in addition, the insulating qualities of some bonded sheets at operating temperatures are insufficient for avoiding all shock hazard to the operator. It has heretofore been proposed to overcome these disadvantages of mica sheets by enclosing a heating element in a glass tube, but these proposals have not been completely satisfactory since the glass tubes have been mounted so that they are easily breakable, or the mountings for the glass tube have been relatively complicated and expensive.

It is a primary object of the present invention to overcome the above mentioned problems of the prior art by providing a novel heating unit for toasters and the like, wherein the heating element is inserted in a glass tube, which glass tube is mounted in a simple and economical manner so as to have adequate resistance to breakage.

Another object of the present invention is to provide a heating unit, as set forth in the preceding paragraph, with novel means for supporting the glass tube so as to accommodate the different expansion and contraction of the glass tube and its mounting without substantially any danger of breakage.

Still another object of the present invention is to provide a novel heating unit of the general type set forth above which is of relatively simple and economical construction and relatively more efficient in operation.

A further object of this invention is to provide a novel heating unit of the above described type which may be relatively easily cleaned.

Other objects and advantages of the present invention will become apparent from the following description and the accompanying drawings, wherein:

Fig. 1 is a perspective view illustrating a heating unit involving the novel principles of this invention;

Fig. 2 is a top plan view of the heating unit shown in Fig. 1;

Fig. 3 is a vertical cross sectional view taken along line 3—3 in Fig. 1;

Fig. 4 is a horizontal cross sectional view taken along line 4—4 in Fig. 1;

Fig. 5 is a side elevational view illustrating a modified form of the present invention;

Fig. 6 is a bottom plan view of the heating unit shown in Fig. 5;

Fig. 7 is an enlarged fragmentary cross sectional view taken along line 7—7 in Fig. 5;

Fig. 8 is an enlarged fragmentary cross sectional view view taken along line 8—8 in Fig. 5;

Fig. 9 is a side elevational view illustrating another modified form of the present invention;

Fig. 10 is a side elevational view illustrating still another modified form of the present invention; and Fig. 11 is a horizontal cross sectional view taken along line 11—11 in Fig. 10.

Referring now more specifically to the drawings, wherein like parts are designated by the same numerals throughout the various figures, a heating unit 12 embodying the features of this invention is shown in Figs. 1 through 4. The heating unit 12 includes a continuous convolute glass tube 14 having a plurality of transverse sections 16 joined with each other by generally U-shaped sections 18. A continuous electrical resistance heating element 20 is inserted through the glass tube. Preferably, the opposite ends of the glass tube are crimped against the heating element, as at 22 and 24, to restrict entry of outside air into the tube. Even though the opposite ends of the glass tube are not hermetically sealed, the tube protects the heating element from the atmosphere, thus enabling the heating element to be operated at a higher temperature for more efficient radiant heating. Since the heating element may be operated at a higher temperature, substantial economies may be effected by decreasing the cross sectional area and the length of the heating element as compared to prior heating elements which have been wound on a mica card or otherwise disposed so as to be unprotected from the atmosphere.

In accordance with a feature of this invention, novel means is provided for supporting the convolute glass tube 14 in a manner so as substantially to reduce any possibility of breaking the glass tube. This means includes a pair of opposed generally U-shaped channel-members 26 and 28 which receive the looped or U-shaped glass tube sections at opposite sides of the generally rectangular plane figure provided by the entire convolute glass tube. In the embodiment illustrated in Figs. 1 through 4, the channel members 26 and 28 are provided at opposite margins of and from continuations of a thin metal sheet 30. The metal sheet is light in color and may be conveniently made from aluminum so as to provide a reflector for directing radiant heat in a manner to increase the over-all efficiency of heating units. Preferably, the metal is provided with a plurality of transversely extending reinforcing ribs 32 and 34 to increase the strength and rigidity thereof.

As set forth above, the looped or U-shaped sections 18 of the glass tube are confined between opposite legs of the U-shaped channel members so that the U-shaped sections are held in a common plane. This prevents undue lateral flexing of the glass tube which might cause the tube to break. In addition, as shown best in Figs. 2 and 4, the channel members 26 and 28 are lined with relatively yieldable liner member 36 and 38, respectively. These liners are formed from a heat-resisting electric-insulating material such as asbestos and prevent direct glass to metal contact, thus insulating the heating element and further reducing any possibility of glass breakage. In order to retain the convolute glass tube against longitudinal displacement in the channel members and further to prevent undue vertical flexing of individual convolutions of the tube, a plurality of inwardly bent detents 40 are formed in the channel member 26, and similar detents are formed in the channel member 28. It should be noted that these detents are formed in the outer legs of their respective channel members and are located within each looped tube section so that each loop is confined against undue longitudinal movement within its associated channel member. However, as shown best in Fig. 3, the detents are positioned so as to be normally spaced from opposite legs of each tube convolution, whereby to permit some flexing of the tube. In addition, as shown best in Figs. 2 and 4, the glass tube is normally spaced slightly from the bottoms or closed ends of the U-shaped channel members to allow for expansion of the tube when heated. With this structure, it is seen that the glass tube is effectively retained against any tendency to flex unduly out of its original plane and at the same time is loosely retained or supported to allow for expansion and contraction. Furthermore, by the simple means described above for retaining a glass tube at a plurality of points, a continuous or one piece tube may be utilized, whereby to protect the electrical heating element from the atmosphere.

While the above described body means satisfactorily supports the glass tube for most uses, further protection against breakage may be provided by securing the ends of the tube to the sheet metal member 30. In the embodiment illustrated in Figs. 1 through 4, this has been accomplished by securing in any suitable way the lower end 44 of the heating element 20 to a metal grommet 46 fastened to the sheet metal member. The grommet 46 thus becomes an electrical terminal and is insulated from the sheet metal body member by a pair of washers 48 and 50 of suitable insulating material. Furthermore, if it is anticipated that the heating unit may receive unduly rough handling, it is sometimes desirable to provide means for preventing intermediate portions of the transverse glass tube sections 16 from contacting the sheet metal member. This may be accomplished by placing a cord 52 of suitable heat resisting material between the glass tube and the sheet material member. In the particular embodiment illustrated, the cord 52 is passed through suitable slots 54 and 56 in the lower edge of the sheet material member, and the free ends of the cord are held by tabs 58 and 60 which are crimped into tight engagement with the cord. By providing this relatively thin cord, it is seen that the intermediate portions of the tube are effectively prevented from engaging the sheet material member, and at the same time, the amount of heat reflected by sheet material member 30 remains substantially undiminished.

Figs. 5 through 8 illustrate a heating unit 62 which embodies a modified form of the present invention. This heating unit includes a convolute glass tube 64 having a heating element 66 therein, which tube and heating element are substantially identical to the above described corresponding parts of the heating unit 12.

The glass tube supporting means of the heating unit 62 includes a pair of separate U-shaped channel members 68 and 70 which are adapted to be mounted in a toaster or like heating appliance by any suitable means. As before, the channel members of this embodiment are lined with relatively yieldable members 72 and 74, respectively, and are adapted to receive between opposite sides or legs thereof the looped or U-shaped sections of the glass tube. This embodiment, instead of having detents formed in the sheet material channel members, has a plurality of fingers 76 and 78 extending from opposite legs of the U-shaped channel members and bent inwardly as shown best in Fig. 8 to retain the individual convolutions of the glass tube in the desired position. It is understood that the fingers 76 and 78 are arranged within each looped section of the glass tube and loosely retain the glass tube in substantially the manner as the above described detents in the heating unit 12.

The heating unit 62 is also provided with a sheet material reflector for increasing the efficiency of the heating operation. In the illustrated form, a reflector member 80 has been provided which is adapted to be removably associated with the channel members 68 and 70. In order to retain the reflector 80, a pair of tabs 82 and 84 are struck from the channel member 68, and similar tabs 86 and 88 are struck from the channel member 70. As shown best in Figs. 6, 7, and 8, tabs 82 through 88 are formed on both sides of the channel members 68 and 70 so that the reflector may be positioned on either side of the heating element. It should be noted that the tabs 82 through 88 are positioned between adjacent looped portions of the glass tube, whereby the above described deformable fingers may be provided for retaining each looped section. In order to assemble the reflector 80, which is preferably made of sheet metal, it is merely necessary to insert the edges of the reflector under the tabs and slide the reflector down from the position shown in dotted lines in Fig. 5 to the full line position. With this structure, it is obvious that the reflector may be readily removed at any time for either cleaning or replacement.

In Fig. 9, there is illustrated a heating unit 90 which embodies another slightly modified form of the present invention. In this embodiment, a heating element 92 is also inserted within a convolute glass tube 94. However, the glass tube 94 is bent so that it includes looped or generally U-shaped sections 96 and 98 at opposite sides of the generally rectangular plane figure formed by the outline of the tube and looped or generally U-shaped sections 100 between the sections 96 and 98 and at a third side of the rectangular figure.

In the heating unit 90, the glass tube 94 is supported by a pair of channel members 102 and 104 which are integrally interconnected by a sheet metal reflector member 106. As shown in the drawings, the channel members 102 and 104 are disposed to confine the opposite looped sections 96 and 98, and, in addition, a similar channel member 108 integral with the sheet metal member 106 is provided for confining the looped sections 100. With this structure, it is seen that the glass tube 94 is effectively retained in its original plane by engagement with the channel members disposed along three sides of the figure provided by the glass tube. In addition, the free ends of the glass tube are retained in position by connecting the ends of the heating element to metal grommets 110 and 112 which are arranged on and insulated from the sheet metal member 106 in substantially the same manner as the above described terminal grommet 46 is associated with the sheet metal member 30 of the heating unit 12.

The channel members 102 and 104 are similar to the above described channel members 26 and 28 and are preferably lined with suitable yieldable liner members. However, the loop confining detents have been omitted from the channel members 102 and 104 since the particular configuration and arrangement of the glass tube 94 substantially reduce the need for the detents. It should be noted that the glass tube 94 is formed so that sections 114 extend from the looped sections 96 diagonally with respect to the channel member 102 and only a portion of the way across the reflector, and sections 116 extend in a similar manner from the looped sections 98. Because of this arrangement, the looped sections 96 and 98 may abut the closed ends of the U-shaped channel members or the liners therein, and any expansion of the tube merely causes the looped sections to slide upwardly with respect to the channel members so that breakage is prevented while at the same time any tendency for the glass tube to flex unduly either in or out of its normal plane is restricted by the relatively short convolutions thereof. The tube is, of course, retained against longitudinal displacement out of the channel members 102 and 104 by the channel member 108 at one end and the attachment to the grommet-like terminals 110 and 112 at the opposite end.

Figs. 10 and 11 illustrate a heating unit 118 which embodies still another modified form of the present invention. This heating unit includes a pair of opposed channel members 120 and 122 integrally connected by a sheet material member 124. The channel members 120 and 122 are preferably lined with yieldable liner members 126 and 128 and are provided with inwardly formed detents 130 and 132. Thus, the channel members 120 and 122 in the sheet metal member 124 are essentially identical to the above described corresponding members 26, 28, and 30 and need not be further described in detail.

The heating unit 118 includes an electrical heating element 134 threaded through a glass tube 136. As shown best in Fig. 10, the glass tube is bent to provide a plurality of sections 138 extending only part way across the sheet material or reflector 124, which sections are joined at their ends by looped or U-shaped sections 134 and 136. A second and similar pattern is formed with the glass tube so as to include transversely extending sections 138 joined at their inner ends by looped sections 140 and at their outer ends by looped or U-shaped sections 142. At one end, the outer looped sections 136 and 142 of the glass tube are joined by a transverse section 144 extending entirely across the reflector so that the two patterns are provided by a continuous tube.

In order to retain the inner looped sections 134 and 140 against lateral flexing, means is secured to the sheet material member 124 which in effect provides channel members adapted to confine looped sections. This means includes oppositely facing angle members 146 and 148 adapted to overlie the looped sections 134 and 140 in the manner illustrated. The angle members are respectively provided with tabs 150 and 152 which are adapted to be inserted through suitable slots in the sheet material member 124 and bent in the manner illustrated best in Fig. 11, whereby to retain the angle members in the desired position. In addition, the outer ends of the angle members may be held together by securing a cover plate 153 thereto with any suitable means. Preferably, the oppositely facing channels provided by the angle members and the sheet material member 124 are lined with elongated yieldable members 154 and 156 to prevent direct metal and glass contact. With this structure, it is seen that the glass tube is securely supported at both sides and at the mid portion of the sheet material member or reflector so that a very rugged structure is provided. In addition, the glass tube is further supported against breakage by anchoring the free ends thereof. This may be accomplished by securing the opposite ends of the heating element 134 to terminal grommets 158 and 160 mounted on the reflector member. These grommets may conveniently be constructed and insulated from the reflector in the same manner as the grommet 46 described above.

From the above description, it is seen that the present invention has provided a novel heating unit including a heating element enclosed in a glass tube, which unit is provided with simple and economical means for supporting the glass tube so that a very rugged structure is obtained. Furthermore, it is seen that the present invention has provided a relatively simple and economical heating unit utilizing a glass tube for enclosing the heating element, whereby the element may be operated at relatively high temperatures for efficient operation. In addition, it will be understood that by utilizing a glass tube and the relatively simple mounting structure of this invention for supporting the tube, a heating unit has been provided which may be relatively easily cleaned.

While the preferred embodiment of the present invention has been shown and described herein, it is obvious that many structural details may be changed without departing from the spirit and scope of the appended claims.

The invention is claimed as follows:

1. In combination in an electric heating unit, a convolute glass tube having a plurality of separated curved portions which lie substantially in a common plane, a relatively thin sheet material channel-shaped supporting member having opposed side portions embracing said curved portions and supporting them and a bottom portion traversing outermost parts of a plurality of said curved portions, and an electric resistance conductor extending through said tube for carrying the heating current.

2. The combination of claim 1, wherein said channel-shaped supporting member is formed of metal, and there is included a liner of yielding, heat-resisting, electric-insulating material in said channel for spacing said tube from the metal thereof.

3. In combination in an electric heating unit, a convolute glass tube having a plurality of separated curved portions disposed substantially in a common plane, channel-shaped supporting member formed of thin deformable material having opposed side portions embracing said curved portions and supporting them and a bottom portion traversing outermost parts of a plurality of said curved portions, said material of one of the opposing sides of the channel being deformed toward the other at a point within the bend of one of said curved portions, but spaced from the tube, for retaining said curved portion loose in the channel, and an electric resistance conductor extending through said tube for carrying a heating current.

4. In combination in an electric heating unit, a convolute glass tube having a substantially plane configuration including a plurality of bends at the edge thereof, a plurality of relatively thin sheet material channel members each including a pair of opposed side portions embracing a plurality of said bends for supporting them against relative movement transverse the plane of said configuration and a bottom portion traversing a plurality of said bends, and an electric resistance conductor in said tube.

5. The combination of claim 4, wherein a pair of said channel members lies substantially parallel to each other at opposite edges of said plane configuration with the bottom portions in opposing relationship, and wherein there are included a thin metal sheet and clips on said channels for removably receiving and holding said sheet.

6. In combination in an electric heating device, a pair of relatively thin sheet material channel members, a glass tube formed into a plurality of spans extending from one channel member to the other joined by U-bends which lie in said channels, said channel members being disposed so that bottom portions thereof traverse a plurality of said U-bends, a plurality of means integral with said channel members and deformed inwardly thereof loosely retaining said U-bends in the channels, and an electric resistance conductor extending through said tube.

7. In combination in an electric heating element, a metal sheet having a pair of return-bent, channel-like edges, a convolute glass tube having a plurality of curved portions lying in each of said channels and held thereby to said sheet for support thereby with the bottoms of said channels traversing a plurality of said curved portions, and an electric resistance conductor in said glass tube.

8. The combination of claim 7, wherein there is included at least one terminal member for said conductor mounted on said metal sheet.

9. In combination in a planar electric heating unit for a toaster or the like, a metal sheet, three substantially parallel channel members on said sheet, two of which lie near opposite edges of the sheet and face each other and the third of which lies between the other two and has a channel facing each of said other two, a convolute glass tube formed into two patterns, comprising short transverse runs between adjacent channel members, connected by U-bends that lie in the channels thereof, the two patterns being joined by a long transverse run between the two outermost channels, an electric resistance conductor extending through said tube and a terminal member for said conductor mounted on said metal sheet near each end of said tube.

10. In combination in a planar electric heating unit, a thin metal sheet having a pair of opposed, return-bent, channel-like edges, a convolute glass tube having a configuration, comprising a plurality of runs extending along said sheet and connected by U-bends lying in said channels, at least one such U-bend being secured in each channel for retaining said tube in place, a strip of yielding, heat-resisting material carried by said sheet, extending in a direction transverse said runs of said tube and lying between said runs and said sheet, and an electric resistance conductor extending through said glass tube.

11. In combination, an electric heating unit, a convolute glass tube having a plurality of separated curved portions which lie substantially in a common plane, a supporting member having opposed sides embracing opposite sides of said curved portions and retaining them within said common plane and a bottom portion traversing a plurality of said curved portions, means integral with and deformed inwardly of said supporting member and extending within said curved portions and loosely retaining said curved portions for limited flexing movement within said common plane, and an electric resistance conduit extending through said glass tube.

12. The combination of claim 11, wherein said supporting member is formed of thin deformable material, and wherein said last named means includes a rounded detent deformed inwardly from said material at a point within one of said curved portions of the tube but spaced from the tube.

13. The combination of claim 11, wherein said supporting member is formed of thin deformable material, and wherein said last named means includes a finger-like element integral with said material and deformed inwardly at a point within the bend of one of said curved portions of the tube, but spaced from the tube.

14. In combination in a planar electric heating unit, a thin metal sheet having a pair of opposed, return-bent, channel-like edges, a convolute glass tube having a configuration comprising a plurality of runs extending transversely of said thin metal sheet connected by U-bends disposed within said channels, means for securing at least one of such U-bends in each channel for retaining said tube in place, a strip of yielding heat resisting material disposed in each channel for preventing the glass tube from contacting the channels, an element of heat resisting material disposed between said transversely extending runs and a portion of said thin metal sheet between said opposed edges thereof for preventing said runs from contacting mid portions of the metal sheet, and an electric resistance conductor extending through said glass tube.

15. In combination in an electric heating unit, a convolute glass tube having a substantially plane configuration including a plurality of bends at the edge thereof, a pair of generally opposed channel members each embracing a plurality of said bends for supporting the bends against relative movement transverse the plane of said configuration, an electric resistance conductor in said tube, a thin sheet metal member, and tabs on opposite sides of each of said channel members for removably receiving and holding said sheet member on opposite sides of the glass tube.

16. The combination of claim 15 which includes a plurality of deformable finger-like elements integral with said channel members and each extending inwardly at a point within one of said bends of the tube, but spaced from the tube, and retaining the bends for limited flexing movement within the plane of said configuration.

References Cited in the file of this patent
UNITED STATES PATENTS

| | | |
|---|---|---|
| 1,032,267 | Bastian | July 9, 1912 |
| 1,680,768 | Dalton | Aug. 14, 1928 |
| 1,809,565 | Ostrak | June 9, 1931 |
| 1,957,227 | Reimers et al. | May 1, 1934 |
| 2,424,780 | Trent | July 29, 1947 |
| 2,606,989 | Gomersall | Aug. 12, 1952 |